United States Patent
Han et al.

(10) Patent No.: US 11,231,774 B2
(45) Date of Patent: Jan. 25, 2022

(54) METHOD FOR EXECUTING OPERATION ACTION ON DISPLAY SCREEN AND DEVICE FOR EXECUTING OPERATION ACTION

(71) Applicant: BOE Technology Group Co., Ltd., Beijing (CN)

(72) Inventors: Yanling Han, Beijing (CN); Xue Dong, Beijing (CN); Haisheng Wang, Beijing (CN); Chun-wei Wu, Beijing (CN); Xiaoliang Ding, Beijing (CN); Yingming Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/070,269

(22) PCT Filed: Nov. 9, 2017

(86) PCT No.: PCT/CN2017/110205
§ 371 (c)(1),
(2) Date: Nov. 6, 2019

(87) PCT Pub. No.: WO2018/209902
PCT Pub. Date: Nov. 22, 2018

(65) Prior Publication Data
US 2020/0125164 A1    Apr. 23, 2020

(30) Foreign Application Priority Data
May 19, 2017   (CN) .......................... 201710359272.4

(51) Int. Cl.
*G06F 3/01*   (2006.01)
*G06F 3/14*   (2006.01)

(52) U.S. Cl.
CPC .............. *G06F 3/013* (2013.01); *G06F 3/017* (2013.01); *G06F 3/14* (2013.01); *G09G 2320/0261* (2013.01)

(58) Field of Classification Search
CPC   G06F 3/013; G06F 3/017; G06F 3/14; G09G 2320/0261
(Continued)

(56) References Cited

U.S. PATENT DOCUMENTS 9,832,452 B1 * 11/2017 Fotland ..................... G01S 3/00
2005/0243054 A1   11/2005 Beymer et al.
(Continued)

FOREIGN PATENT DOCUMENTS

| CN | 1694043 A | 11/2005 |
| CN | 102866776 A | 1/2013 |

(Continued)

OTHER PUBLICATIONS

International Search Report and Written Opinion issued in corresponding International Patent Application No. PCT/CN2017/110205, dated Feb. 23, 2018.

(Continued)

*Primary Examiner* — Kent W Chang
*Assistant Examiner* — Sujit Shah
(74) *Attorney, Agent, or Firm* — McDermott Will & Emery LLP

(57) ABSTRACT

The present disclosure discloses a method for executing an operation action on a display screen and a device for executing an operation action. Firstly, a gazing position of an operator's eyes on the display screen and a corresponding operation position of the operator's operating portion on the display screen are determined, then a corresponding operation is executed for content displayed on the display screen according to the operation action of the operating portion, (Continued)

when it is determined that the gazing position of the operator's eyes on the display screen is consistent with the corresponding operation position of the operator's operating portion on the display screen. Therefore, the method needs to not only determine the corresponding operation position of the operator's operating portion on the display screen, but also determine the gazing position of the operator's eyes on the display screen, and the corresponding operation is executed for the content displayed on the display screen according to the operation action of the operating portion only when the two positions are consistent with each other.

9 Claims, 7 Drawing Sheets

(58) Field of Classification Search
USPC .......................................................... 345/156
See application file for complete search history.

(56) References Cited

U.S. PATENT DOCUMENTS

| | | | | |
|---|---|---|---|---|
| 2010/0125816 | A1* | 5/2010 | Bezos | G06F 3/013 |
| | | | | 715/863 |
| 2013/0145304 | A1 | 6/2013 | DeLuca et al. | |
| 2013/0155026 | A1* | 6/2013 | Dong | G06F 3/011 |
| | | | | 345/175 |
| 2013/0321643 | A1* | 12/2013 | Fujinawa | G06F 3/0304 |
| | | | | 348/169 |
| 2014/0098198 | A1* | 4/2014 | Lee | G06F 3/013 |
| | | | | 348/48 |
| 2014/0219515 | A1* | 8/2014 | Karakotsios | G06K 9/00167 |
| | | | | 382/115 |
| 2014/0313294 | A1* | 10/2014 | Hoffman | G06K 9/00604 |
| | | | | 348/47 |
| 2015/0009334 | A1* | 1/2015 | Kwon | H04N 5/332 |
| | | | | 348/164 |
| 2015/0145762 | A1* | 5/2015 | Shimura | G06F 3/017 |
| | | | | 345/156 |
| 2015/0199003 | A1* | 7/2015 | Zhang | G06K 9/0061 |
| | | | | 345/156 |
| 2017/0052588 | A1* | 2/2017 | Zhang | G06F 3/013 |
| 2017/0192500 | A1* | 7/2017 | Hao | G06F 3/0483 |
| 2017/0227841 | A1* | 8/2017 | Niemela | G03B 35/08 |
| 2017/0293357 | A1 | 10/2017 | Li et al. | |

FOREIGN PATENT DOCUMENTS

| | | |
|---|---|---|
| CN | 103488299 A | 1/2014 |
| CN | 103793060 A | 5/2014 |
| CN | 104123161 A | 10/2014 |
| CN | 104364733 A | 2/2015 |
| CN | 104866100 A | 8/2015 |
| CN | 105009032 A | 10/2015 |
| CN | 105824400 A | 8/2016 |
| CN | 106066694 A | 11/2016 |
| CN | 107219921 A | 9/2017 |

OTHER PUBLICATIONS

Office Action issued in corresponding Chinese Patent Application No. 201710359272.4, dated Feb. 28, 2019.

* cited by examiner

METHOD FOR EXECUTING OPERATION ACTION ON DISPLAY SCREEN AND DEVICE FOR EXECUTING OPERATION ACTION

CROSS-REFERENCE TO RELATED APPLICATION

This application claims the priority benefit of Chinese Patent Application No. 201710359272.4 filed on May 19, 2017 and entitled "METHOD AND SYSTEM FOR EXECUTING OPERATION ACTION ON DISPLAY SCREEN" in the State Intellectual Property Office of China, the disclosure of which is incorporated herein by reference in entirety.

BACKGROUND

Technical Field

Embodiments of the present disclosure generally relate to the field of three-dimensional display technology, and in particular, to a method for executing an operation action on a display screen and a device for executing an operation action.

Description of the Related Art

Gesture interaction technology is a technology by which an operator can control a system through his/her own hand. By means of this technology, the operator only needs to execute corresponding actions before a display screen, and the display screen detects an image of the hand and coordinate data of the hand, and thereby determines an operation position and a gesture command of the operator's hand so as to control a corresponding image on the display screen to execute a corresponding action.

SUMMARY

An embodiment of the present disclosure provides a method for executing an operation action on a display screen, the method including:
detecting a gazing position of an operator's eyes on the display screen and an operation position of the operator's operating portion on the display screen respectively;
comparing the gazing position of the operator's eyes on the display screen with the operation position of the operator's operating portion on the display screen to determine whether the gazing position is consistent with the operation position or not;
in response to the gazing position of the operator's eyes on the display screen being consistent with the operation position of the operator's operating portion on the display screen, executing a corresponding operation for content displayed on the display screen according to the operation action of the operating portion.
In some embodiments, comparing the gazing position of the operator's eyes on the display screen with the operation position of the operator's operating portion on the display screen to determine whether the gazing position is consistent with the operation position or not includes:
detecting whether a distance between the gazing position of the operator's eyes on the display screen and the operation position of the operator's operating portion on the display screen is within a preset range or not;
in response to the distance within the preset range, determining that the gazing position of the operator's eyes on the display screen is consistent with the operation position of the operator's operating portion on the display screen; and
in response to the distance outside the preset range, determining that the gazing position of the operator's eyes on the display screen is not consistent with the operation position of the operator's operating portion on the display screen.
In some embodiments, a set of position identifiers are provided at a border of the display screen, and
detecting the gazing position of the operator's eyes on the display screen and the operation position of the operator's operating portion on the display screen respectively includes:
adopting the set of position identifiers as a preliminary position identifying device;
detecting the gazing position of the operator's eyes on the display screen and the operation position of the operator's operating portion on the display screen respectively by using the preliminary position identifying device.
In some embodiments, a plurality of sets of position identifiers are provided at a border of the display screen, and
detecting the gazing position of the operator's eyes on the display screen and the operation position of the operator's operating portion on the display screen respectively includes:
determining one set of position identifiers or one position identifier in the plurality of sets of position identifiers as a preliminary position identifying device according to identifiable ranges of the plurality of sets of position identifiers;
detecting the gazing position of the operator's eyes on the display screen and the operation position of the operator's operating portion on the display screen respectively by using the preliminary position identifying device.
In some embodiments, the preliminary position identifying device includes a gazing position identifier and an operating portion identifier, and
detecting the gazing position of the operator's eyes on the display screen and the operation position of the operator's operating portion on the display screen respectively by using the preliminary position identifying device includes:
detecting the gazing position of the operator's eyes on the display screen by using the gazing position identifier while detecting the operation position of the operator's operating portion on the display screen by using the operating portion identifier; or
detecting the gazing position of the operator's eyes on the display screen by using the gazing position identifier, and then detecting the operation position of the operator's operating portion on the display screen by using the operating portion identifier; or
detecting the operation position of the operator's operating portion on the display screen by using the operating portion identifier, and then detecting the gazing position of the operator's eyes on the display screen by using the gazing position identifier.
In some embodiments, the gazing position identifier includes a first camera configured to acquire a photograph including the operator's eyes and a first infrared transceiver, and
detecting the gazing position of the operator's eyes on the display screen by using the gazing position identifier includes:
acquiring the photograph including the operator's eyes by the first camera to detect the gazing position of the operator's eyes on the display screen.

In some embodiments, the operating portion identifier includes a second camera configured to acquire a photograph including the operator's the operating portion and a third camera, and detecting the operation position of the operator's operating portion on the display screen by using the operating portion identifier includes:

acquiring photographs including the operating portion respectively by using the third camera and the second camera, so as to determine the operation position of the operator's operating portion on the display screen according to positions of the operating portion in the photographs.

In some embodiments, the third camera and the first camera are one same camera.

In some embodiments, before executing the corresponding operation for the content displayed on the display screen according to the operation action of the operating portion, further including:

determining one set of position identifiers corresponding to a position of the operator according to the detected gazing position of the operator's eyes on the display screen and the position of the operator's operating portion with respect to the display screen;

identifying the operation action of the operating portion by using the determined set of position identifiers.

In some embodiments, a plurality of camera sensors are provided in a display region of the display screen, and detecting the gazing position of the operator's eyes on the display screen and the operation position of the operator's operating portion on the display screen respectively includes:

acquiring photographs including the operator's eyes and the operating portion by using the camera sensors;

determining the gazing position of the operator's eyes on the display screen and the operation position of the operator's operating portion on the display screen respectively according to the acquired photographs including the operator's eyes and the operating portion.

In some embodiments, a plurality of second infrared transceivers are provided in the display region of the display screen, and before executing the corresponding operation for the content displayed on the display screen according to the operation action of the operating portion, the method further includes:

determining a set of second infrared transceivers corresponding to a position of the operator according to the detected gazing position of the operator's eyes on the display screen and the operation position of the operator's operating portion on the display screen;

identifying the operation action of the operating portion by using the determined set of second infrared transceivers.

An embodiment of the present disclosure provides a device for executing an operation action, including:

a detecting module configured to respectively detect a gazing position of an operator's eyes on a display screen and an operation position of the operator's operating portion on the display screen;

judging comparing module configured to compare the gazing position of the operator's eyes on the display screen with the operation position of the operator's operating portion on the display screen to determine whether the gazing position is consistent with the operation position or not;

an executing module configured to execute a corresponding operation for content displayed on the display screen according to the operation action of the operating portion in response to the gazing position of the operator's eyes on the display screen being consistent with the operation position of the operator's operating portion on the display screen.

In some embodiments, the detecting module includes one or more sets of position identifiers provided at a border of the display screen; each of the sets of position identifiers includes a gazing position identifier and an operating portion identifier; one set of position identifiers is selected as a preliminary position identifying device;

the gazing position identifier in the preliminary position identifying device is configured to detect the gazing position of the operator's eyes on the display screen;

the operating portion identifier in the preliminary position identifying device is configured to detect the operation position of the operator's operating portion on the display screen.

In some embodiments, the gazing position identifier includes;

a first camera configured to acquire a photograph including the operator's eyes and a first infrared transceiver, wherein the detecting module is configured to detect the gazing position of the operator's eyes on the display screen according to the acquired photograph including the operator's eyes.

In some embodiments, the operating portion identifier includes:

a second camera and a third camera configured to acquire photographs including the operator's operating portion, wherein the detecting module is configured to detect the operation position of the operator's operating portion on the display screen according to the photographs including the operating portion acquired by the second camera and the third camera.

In some embodiments, the detecting module includes a plurality of camera sensors and a plurality of second infrared transceivers provided in a display region of the display screen;

the camera sensors are configured to acquire photographs including the operator's eyes and the operating portion; the detecting module is configured to detect the gazing position of the operator's eyes on the display screen and the operation position of the operator's operating portion on the display screen respectively according to the acquired photographs including the operator's eyes and the operating portion;

the second infrared transceivers are configured to detect the operation action of the operating portion.

In some embodiments, the device further includes a rotatable base configured to hold the position identifier rotatably.

In some embodiments, the detecting module includes one or more sets of position identifiers provided at a border of the display screen; each of the sets of position identifiers includes a gazing position identifier and an operating portion identifier; one set of position identifiers is selected as a preliminary position identifying device;

the gazing position identifier in the preliminary position identifying device is configured to detect the gazing position of the operator's eyes on the display screen;

the operating portion identifier in the preliminary position identifying device is configured to detect the operation position of the operator's operating portion on the display screen.

An embodiment of the present disclosure also provides a display screen, including the device for executing the operation action as described above.

DETAILED DESCRIPTION OF EMBODIMENTS

A method for executing an operation action on a display screen and a device for executing an operation action according to the embodiments of the present disclosure will be described in detail below with reference to the accompanying drawings. It should be noted that the described embodiments merely represent a portion of embodiments of the present disclosure, rather than all of embodiments of the present disclosure. All other embodiments obtained by those skilled in the art based on the embodiments of the present disclosure without creative efforts shall fall within the scope of the present disclosure.

The inventors have found that, in case of frequent gesture operations of the operator, the hand is always in a raised state, thus when the operator is browsing content displayed on the display screen or talking with other people, a sensor for detecting gesture is always in a detection state. Therefore, it is easy to cause errors in operation or recognition.

Figure 1:
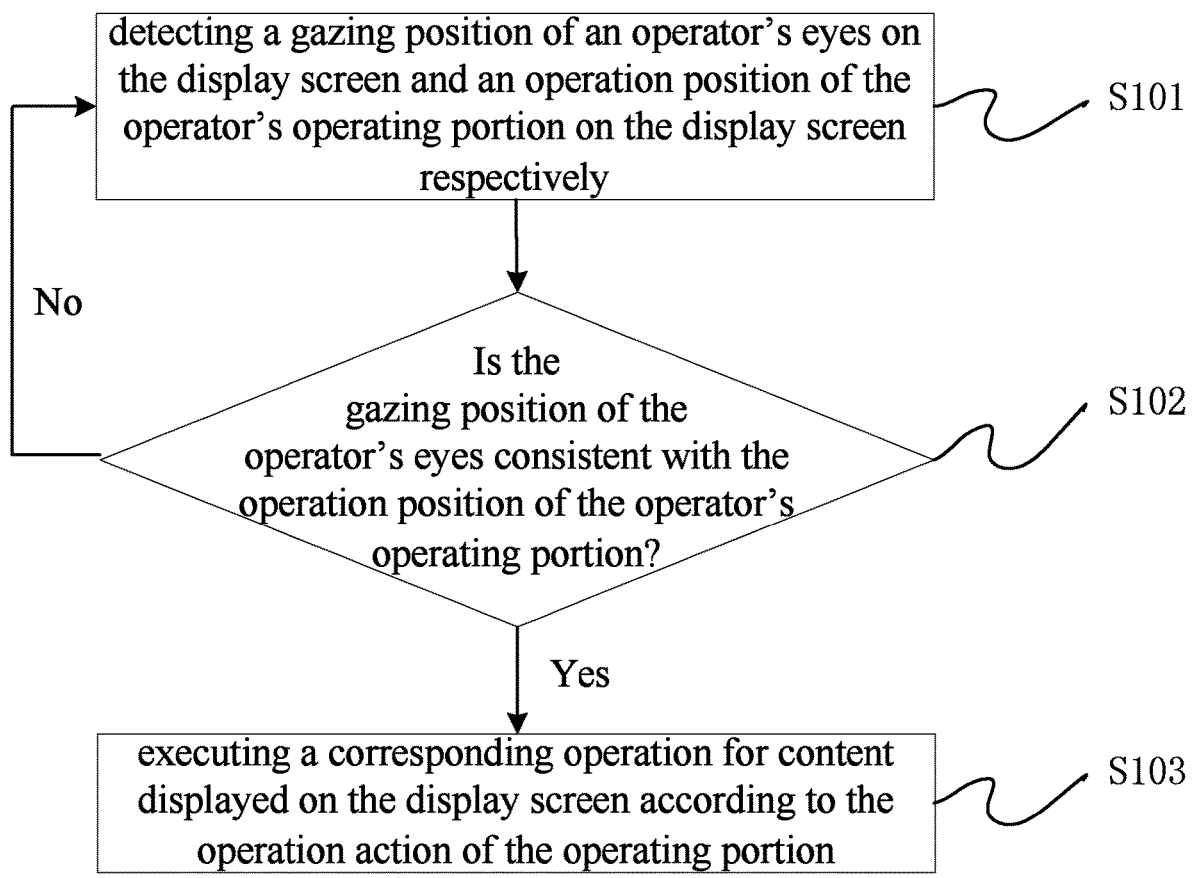
FIG. 1 is a flowchart of a method for executing an operation action on a display screen according to an embodiment of the present disclosure.

An embodiment of the present disclosure provides a method for executing an operation action on a display screen. As shown in FIG. 1, the method may include the following steps:

Step S101: detecting a gazing position of an operator's eyes on the display screen and an operation position of the operator's operating portion on the display screen respectively;

Step S102: comparing the gazing position of the operator's eyes on the display screen with the operation position of the operator's operating portion on the display screen to determine whether the gazing position is consistent with the operation position or not; if yes, then executing the step S103; if not, then returning to the step S101;

Step S103: executing a corresponding operation for content displayed on the display screen according to the operation action of the operating portion.

The method for executing the operation action on the display screen according to the embodiment of the present disclosure not only needs to detect the operation position of the operator's operating portion on the display screen, but also needs to determine the gazing position of the operator's eyes on the display screen. And the corresponding operation cannot be executed for the content displayed on the display screen according to the operation action of the operating portion unless the two positions are consistent with each other. Thus, the method can greatly improve the detection accuracy for the operator's operating portion, thereby improving the operation accuracy for the content displayed on the display screen, effectively avoiding errors in operation and improving the operator's experiences.

It should be noted that, the operation action in the present disclosure refers to an action of the operator for an execution command or other operation contents on the display screen when the operator operates the display screen, and such an action of the operator does not touch the display screen; the operation position of the operator's operating portion on the display screen refers to a position on the display screen corresponding to a position of the operator's operating portion in a space, for example, within a detectable range of the display screen.

Figure 2A:
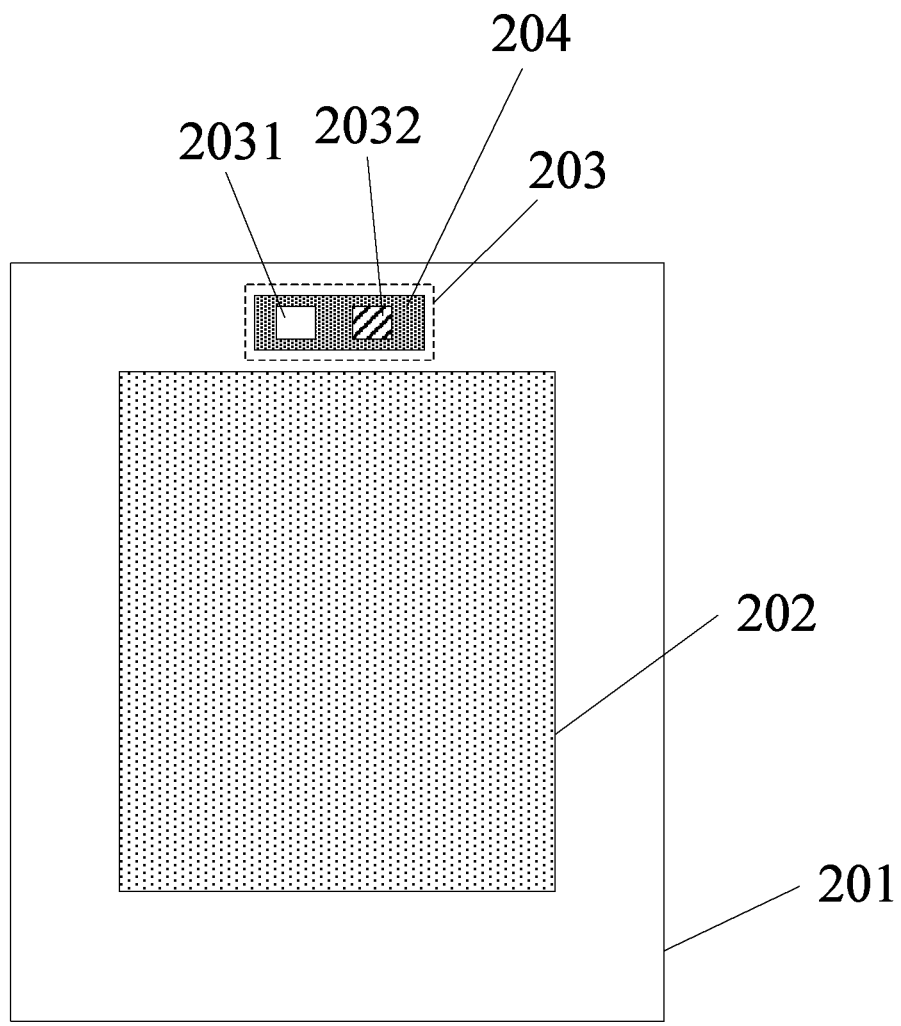
FIG. 2A is a schematic structural view of a display screen according to an embodiment of the present disclosure.
Figure 2B:
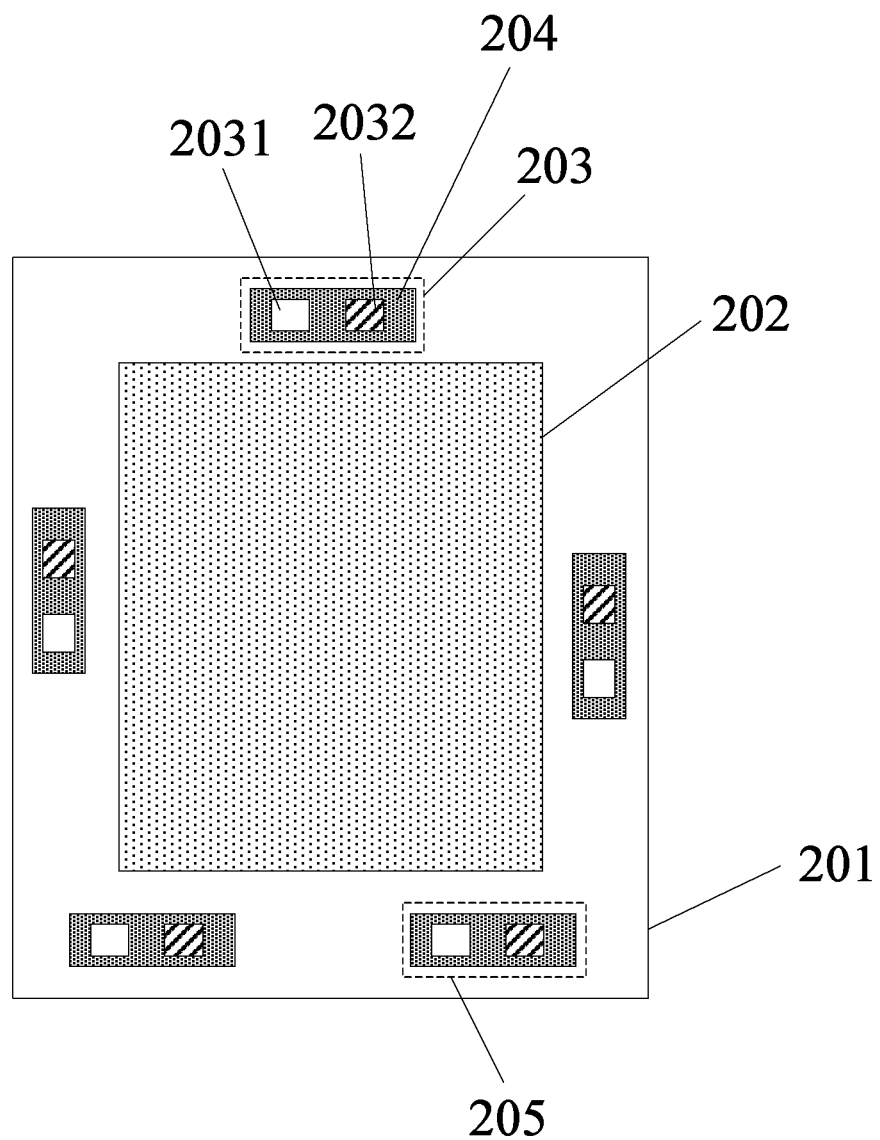
FIG. 2B is a schematic structural view of a display screen according to an embodiment of the present disclosure.

In a specific implementation, in order to realize executing a corresponding and precise operation to the display content of the display screen according to the operation action of the operating portion, and effectively avoid the errors in operation, the method for executing the operation action on the display screen according to the embodiment of the present disclosure may be implemented in different ways, depending on hardware structural features of the display screen. Below, two implementation manners of the display screen are provided to implement the method for executing the operation action on the display screen according to the embodiment of the present disclosure:

In an embodiment of the present disclosure, the display screen is as shown in FIG. 2A or FIG. 2B. At a border of the display screen 201 (a region other than a display region 202), there is at least one set of position identifiers. Taking the position identifier 203 as an example, it is fixed to a rotatable base 204, to allow the position identifier to be rotated in such a way that it faces towards the gazing position of the operator, thereby improving the detection accuracy of the operator's operating portion. The base 204 may be a Micro Electro Mechanical System (MEMS) or other hardware structures, and the base 204 may also be integrated to a Printed Circuit Board (PCB) by means of bonding, or the position identifier 203 may be directly soldered to the PCB to realize an integrated structural design, and thus it is advantageous to realize a design of narrow border of the display screen.

Figure 3A:
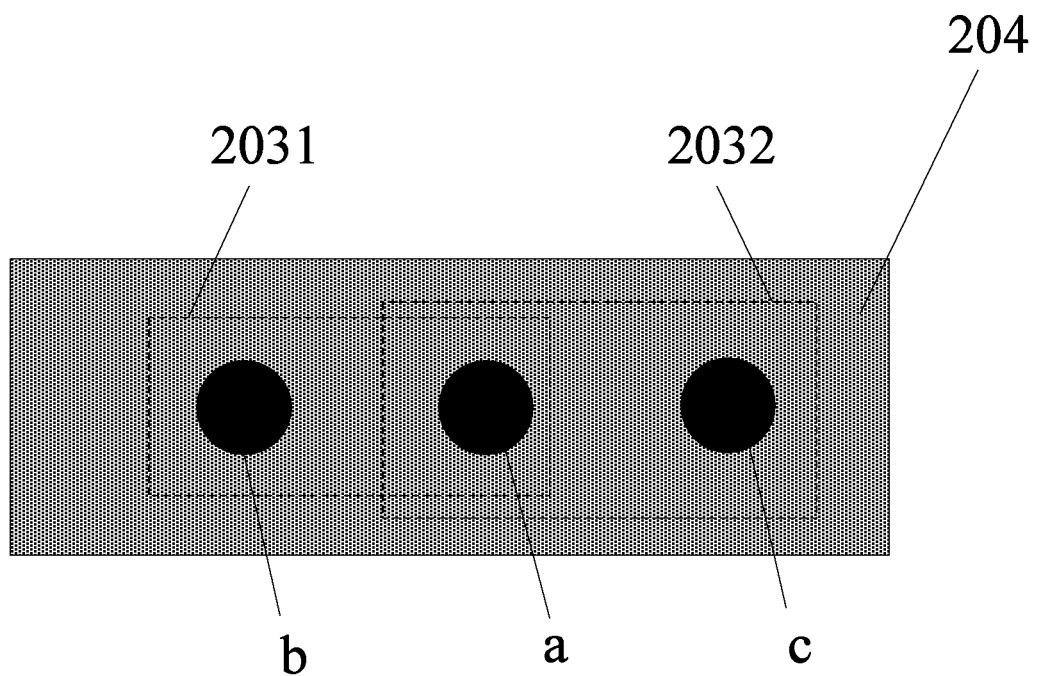
FIG. 3A is a schematic view showing a specific structure of a position identifier according to an embodiment of the present disclosure.
Figure 3B:
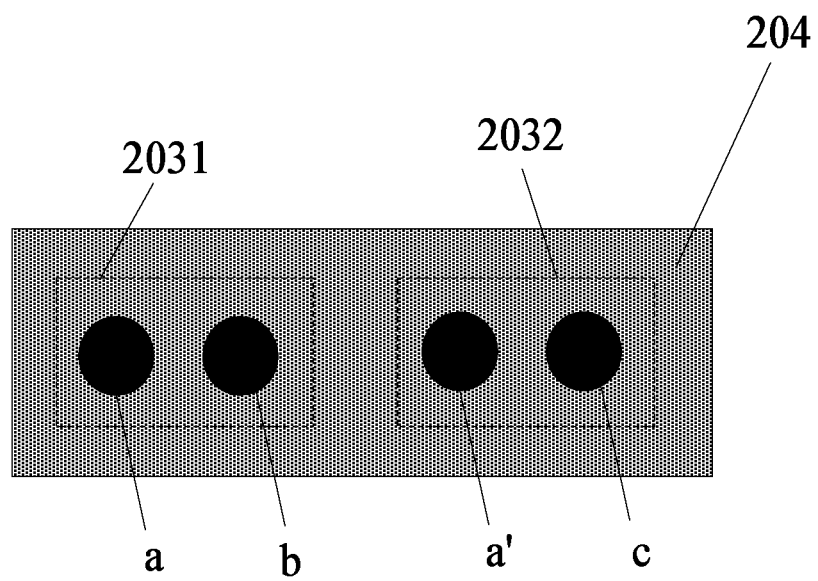
FIG. 3B is a schematic view showing a specific structure of a position identifier according to an embodiment of the present disclosure.

In an embodiment, the position identifier 203 may include a gazing position identifier 2031 and an operating portion identifier 2032. For example, in an embodiment, as shown in FIG. 3A, the position identifier 203 includes a first camera a, that is, the gazing position identifier 2031 may include a first camera a for acquiring a photograph containing the operator's eyes and the operating portion and a first infrared transceiver b for acquiring an operation action of the operating portion of the operator. The operating portion identifier 2032 may include a first camera a for acquiring a photograph containing the operator's eyes and the operating portion and a second camera c for acquiring a photograph containing the operator's eyes and the operating portion. A binocular parallax is formed by the first camera a and the second camera c, to determine depth of field coordinates, so that the position of the operator's operating portion may be determined. In other words, in this embodiment, the first camera a shown in FIG. 3A is shared by the gazing position identifier 2031 and the operating portion identifier 2032. In another embodiment, as shown in FIG. 3B, there are the first camera a and a third camera a' in the position identifier 203, the gazing position identifier 2031 includes a first camera a for acquiring a photograph containing the operator's eyes and the operating portion and a first infrared transceiver b for acquiring an operation action of the operating portion of the operator, and the operating portion identifier 2032 includes the third camera a' for acquiring a photograph containing the operator's eyes and the operating portion and a second camera c for acquiring another photograph containing the operator's eyes and the operating portion. It should be noted that the infrared transceiver may include an infrared transmitter and an infrared receiver, and the infrared transceiver transmits infrared rays and receives the reflected infrared rays, so as to detect information such as position and movement of the object illuminated by the infrared rays.

It is apparent that the specific hardware structures of the gazing position identifier 2031 and the operating portion identifier 2032 are not limited thereto, instead, they may have other hardware structures as long as it is possible to determine the gazing position of the operator's eyes with respect to the display screen 201, the position of the operator's operating portion on the display screen 201, and the information regarding the operation action of the operator's operating portion, and they will not be limited herein.

Figure 4A:
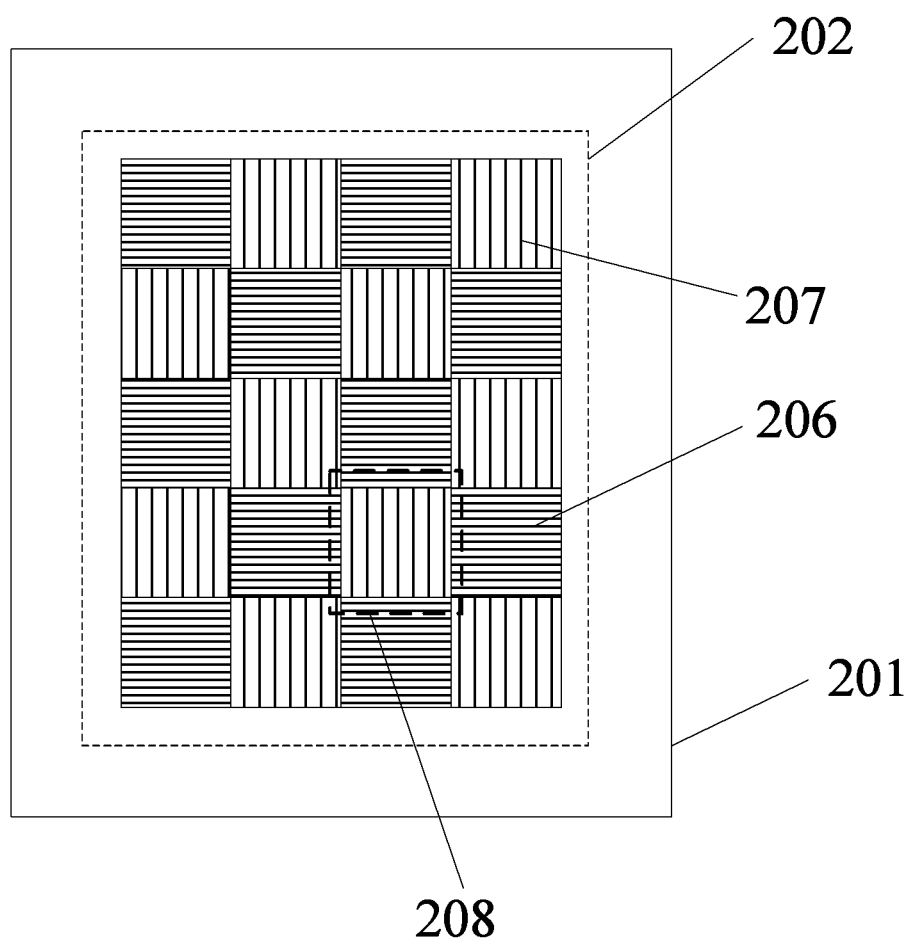
FIG. 4A is a schematic structural view of a display screen according to another embodiment of the present disclosure.
Figure 4B:
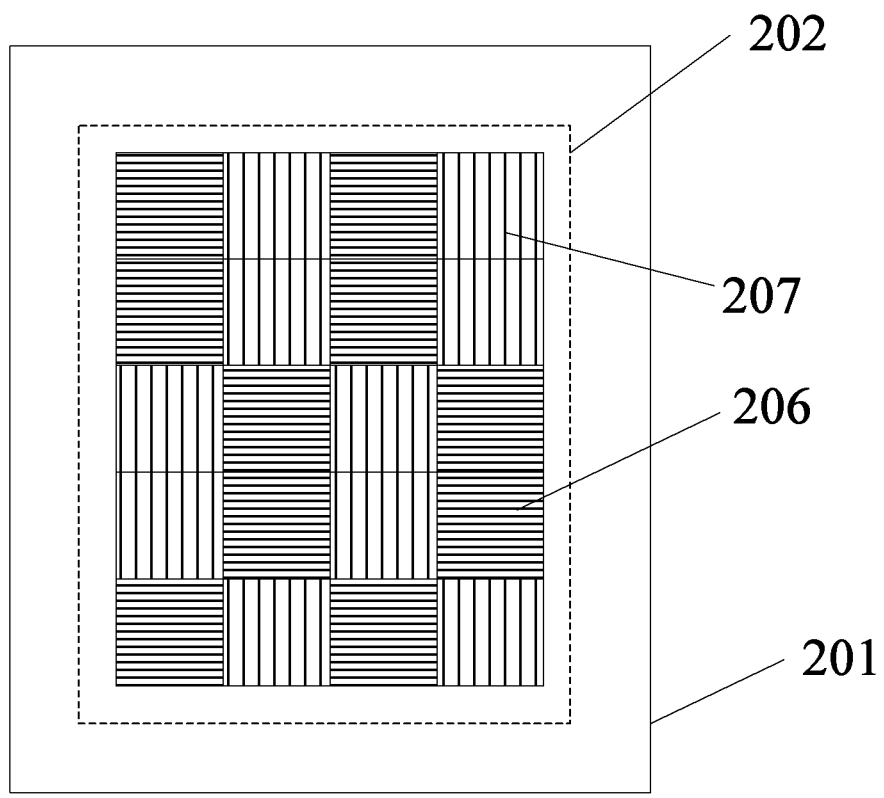
FIG. 4B is a schematic structural view of a display screen according to a further embodiment of the present disclosure.
Figure 4C:
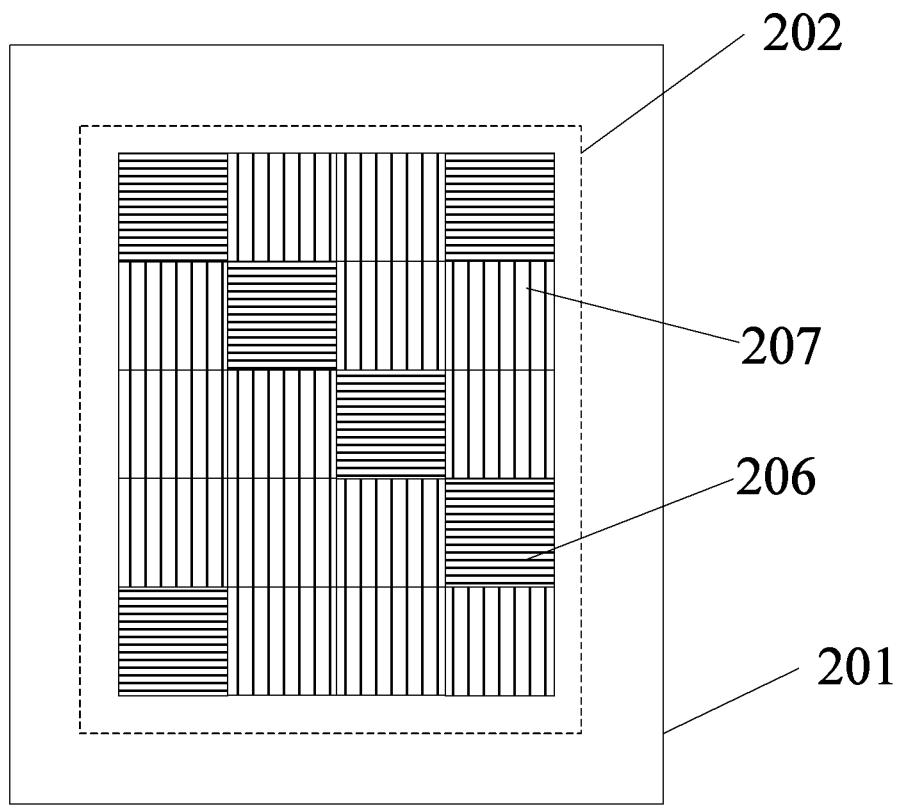
FIG. 4C is a schematic structural view of a display screen according to a still further embodiment of the present disclosure.

In another embodiment of the present disclosure, as shown in FIGS. 4A to 4C (only some of camera sensors 206 and some of second infrared transceivers 207 are shown), in the display region 202 (dashed block) of the display screen 201, there are a plurality of camera sensors 206 (in regions filled with horizontal lines) configured to acquire photographs containing the operator's eyes and the operating portion and a plurality of second infrared transceivers 207 (in regions filled with vertical lines) configured to acquire the operation action of the operating portion of the operator. Herein, the number of the camera sensors 206 is generally not greater than the number of the second infrared transceivers 207, and the camera sensors 206 and the second infrared transceivers 207 are uniformly distributed in the display region 202 of the display screen 201. In an embodiment, as shown in FIGS. 4A and 4b, the number of the camera sensors 206 is equal to the number of the second infrared transceivers 207. In an embodiment, as shown in FIG. 4C, the number of the camera sensors 206 is less than the number of the second infrared transceivers 207. The arrangement of the camera sensors 206 and the second infrared transceivers 207 in the display region 202 is not limited to the arrangements shown in FIG. 4A to FIG. 4C, as long as the camera sensors 206 and the second infrared transceivers 207 are uniformly arranged in the display region 202, therefore the arrangement will not be limited herein. According to the embodiments of the present disclosure, the plurality of camera sensors 206 and the plurality of second infrared transceivers 207 located in the display region 202 may be disposed on an array substrate, an opposite substrate or a packaging substrate of the display screen 201. Depending on different types of display screen, the plurality of camera sensors 206 and the plurality of second infrared transceivers 207 may be differently designed, which will not be specifically limited herein.

In another embodiment of the present disclosure, the technical solutions in the above embodiments may be combined, that is, there are at least one set of position identifiers in a border region of the display screen, and a plurality of camera sensors and a plurality of second infrared transceivers in the display region of the display screen. In this embodiment, the combination of the two structures can greatly improve the detection accuracy for the operator's eyes and the operating portion, thereby greatly improving the operation accuracy for the content displayed on the display screen, and minimizing the probability of errors in the operation.

Next, the above method for executing the operation action on the display screen according to the embodiments of the present disclosure will be described in detail with reference to the structures of the FIG. 2A, FIG. 2B and the structures of FIG. 4A, FIG. 4B, FIG. 4C.

In the case of the structures of FIG. 2A, FIG. 2B, there are at least one set of position identifiers at the border of the display screen. In the method for executing the operation action on the display screen according to the embodiments of the present disclosure, it may be implemented through the following two manners:

In a specific implementation, as shown in FIG. 2A, one set of position identifiers 203 is provided at the border of the display screen 201 (the region other than the display region 202). Accordingly, in the step S101 in the method for executing the operation action on the display screen according to the embodiment of the present disclosure, detecting the gazing position of the operator's eyes on the display screen and the operation position of the operator's operating portion on the display screen respectively may include:

adopting the set of position identifiers as a preliminary position identifying device;

determining the gazing position of the operator's eyes on the display screen and the operation position of the operator's operating portion on the display screen respectively by using the preliminary position identifying device.

In a specific implementation, as shown in FIG. 2B, a plurality of sets of position identifiers 203 are provided at the border of the display screen 201 (the region other than the display region 202 of the display screen 201). Accordingly, in the step S101 in the method for executing the operation action on the display screen according to the embodiment of the present disclosure, detecting the gazing position of the operator's eyes on the display screen and the operation position of the operator's operating portion on the display screen respectively may include:

determining a preliminary position identifying device according to identifiable ranges of the plurality of sets of position identifiers;

detecting the gazing position of the operator's eyes on the display screen and the operation position of the operator's operating portion on the display screen respectively by using the preliminary position identifying device.

Specifically, when the preliminary position identifying device is determined according to the identifiable ranges of the plurality of sets of position identifiers, the set of position identifiers of the plurality of sets of position identifiers which has the best setting position and the largest identifiable range may be used as the preliminary position identifying device, so as to ensure that the determined gazing position of the operator's eyes on the display screen and the determined operation position of the operator's operating portion on the display screen are relatively accurate. In this way, it is favorable for next steps of comparison and detection. However, the selection of the preliminary position identifying device may not be limited to the above manner, but can also be designed according to actual requirements. For example, in the display screen as shown in FIG. 2B, firstly, the gazing position identifier 2031 in the position identifier 203 located at the top of the display screen 201 may be used to determine the gazing position of the operator's eyes with respect to the display screen 201; then, a position identifier (for example, a position identifier 205)

corresponding to the gazing position is used as the preliminary position identifying device, and then the gazing position of the operator's eyes with respect to the display screen 201 and the position of the operator's operating portion with respect to the display screen 201 are detected again.

According to the embodiments of the present disclosure, regardless of whether the display screen has one set of position identifiers or a plurality of sets of position identifiers at the border, the preliminary position identifying device has the same structure, in order to determine the gazing position of the operator's eyes on the display screen and the operation position of the operator's operating portion on the display screen. Therefore, taking the position identifiers 203 shown in FIGS. 3A and 3B as a preliminary position identifying device, in the method for executing the operation action on the display screen according to an embodiment of the present disclosure, the preliminary position identifying device 203 may include a gazing position identifier 2031 and an operating portion identifier 2032.

In an embodiment, the structure shown in FIG. 3A is used. Because there is only one first camera a, the gazing position identifier 2031 constituted by the first camera a and the first infrared transceiver b and the operating portion identifier 2032 constituted by the first camera a and the second camera c cannot work at the same time, and they need to work in a time-divisional manner. That is, after the gazing position identifier 2031 has determined the gazing position of the operator's eyes on the display screen, the operating portion identifier 2032 determines the operation position of the operator's operating portion on the display screen, or alternatively, after the operation position identifier 2032 has determined the operation position of the operator's operating portion on the display screen, the gazing position identifier 2031 determines the gazing position of the operator's eyes on the display screen. In another embodiment, the structure shown in FIG. 3B is used. Because there are the first camera a and the third camera a', operation order of the gazing position identifier 2031 and the operating portion identifier 2032 is not limited.

Therefore, in the method for executing the operation action on the display screen according to an embodiment of the present disclosure, detecting the gazing position of the operator's eyes on the display screen and the operation position of the operator's operating portion on the display screen respectively by using the preliminary position identifying device 203 may include:

detecting the gazing position of the operator's eyes on the display screen by using the gazing position identifier 2031 while detecting the operation position of the operator's operating portion on the display screen by using the operating portion identifier 2032; or detecting the gazing position of the operator's eyes on the display screen by using the gazing position identifier 2031, and then detecting the operation position of the operator's operating portion on the display screen by using the operating portion identifier 2032; or detecting the operation position of the operator's operating portion on the display screen by using the operating portion identifier 2032, and then detecting the gazing position of the operator's eyes on the display screen by using the gazing position identifier 2031.

Further, as shown in FIG. 3A and FIG. 3B, the gazing position identifier 2031 may include a first camera a and a first infrared transceiver b. Therefore, in the method for executing the operation action on the display screen according to an embodiment of the present disclosure, detecting the gazing position of the operator's eyes on the display screen by using the gazing position identifier 2031 may include:

detecting the gazing position of the operator's eyes on the display screen by using the first camera a and the first infrared transceiver b.

Further, as shown in FIG. 3A and FIG. 3B, the operating portion identifier 2032 may include a second camera c and a first camera a. Therefore, in the method for executing the operation action on the display screen according to an embodiment of the present disclosure, detecting the operation position of the operator's operating portion on the display screen by using the operating portion identifier 2032 before or after detecting the gazing position of the operator's eyes on the display screen by using the gazing position identifier 2031 may include:

detecting the operation position of the operator's operating portion on the display screen by using the first camera a and the second camera c.

In a specific implementation, in order to determine whether the detected gazing position of the operator's eyes on the display screen is consistent with the operation position of the operator's operating portion on the display screen or not, to determine whether to execute the next operation, in the step S102 in the method for executing the operation action on the display screen according to an embodiment of the present disclosure, comparing the gazing position of the operator's eyes on the display screen with the operation position of the operator's operating portion on the display screen to determine whether the gazing position is consistent with the operation position or not may specifically include:

detecting whether a distance between the gazing position of the operator's eyes on the display screen and the operation position of the operator's operating portion on the display screen is within a preset range or not;

if yes, determining that the gazing position of the operator's eyes on the display screen is consistent with the operation position of the operator's operating portion on the display screen; and if no, determining that the gazing position of the operator's eyes on the display screen is not consistent with the operation position of the operator's operating portion on the display screen.

Specifically, the preset range may be preset according to actual requirements. Therefore, the preset range is adjustable, and the specific value thereof is not limited herein.

In a specific implementation, before executing the corresponding operation for the content displayed on the display screen according to the action of the operating portion, it is necessary to determine the action of the operator's operating portion. The selection of sets of position identifiers used for determining the information depends on the number of the position identifiers on the display screen.

In an embodiment, a structure in which only one set of position identifiers 203 are provided at the border of the display screen is used, as shown in FIG. 2A. In this case, the position information of the operator's operating portion is determined by the position identifier 203, and then the position identifier 203 is rotated by means of the rotatable base 204 so that the position identifier 203 faces towards the gazing position of the operator, and then the gazing position of the operator's eyes and the action information of the operating portion are further determined by the position identifier 203.

Specifically, in the case of a plurality of sets of position identifiers at the border of the display screen, as shown in FIG. 2B, taking the position identifier 203 as a preliminary position identifying device, it is necessary to determine the gazing position of the operator's eyes with respect to the display screen 201 and the position of the operator's operating portion with respect to the display screen 201 by the preliminary position identifying device 203; then one set of position identifiers corresponding to the position of the operator, for example the position identifier 205, is selected; then, the position identifier 205 is rotated by the rotatable base 204 to face the gazing position of the operator, and the information of the operating portion is determined by the position identifier 205. Therefore, in the method for executing the operation action on the display screen according to an embodiment of the present disclosure, before the step S103 of executing the corresponding operation for the content displayed on the display screen according to the operation action of the operating portion, the method may further include:

determining one set of position identifiers corresponding to a position of the operator according to the determined gazing position of the operator's eyes on the display screen and the determined operation position of the operator's operating portion on the display screen;

detecting the operation action of the operating portion by using the identified set of position identifiers.

In an embodiment of the present disclosure, the structure shown in FIGS. 4A to 4C is used. There are a plurality of camera sensors and a plurality of second infrared transceivers in the display region of the display screen, as shown in FIGS. 4A to 4C, the camera sensors 206 (in regions filled with horizontal lines) are used to determine the gazing position of the operator's eyes on the display screen 201 and the operation position of the operator's operating portion on the display screen 201, and the second infrared transceivers 207 (in regions filled with vertical lines) are used to determine the operating information of the operating portion. Such a structural design can not only achieve precise detection of the operator's operating portion, but also help to realize a design of narrow border of the display screen.

In a specific implementation, the camera sensor 206 is provided in each pixel region of the display region 202, and each camera sensor 206 cannot tune focus, therefore focal lengths of the camera sensors 206 located in the pixel regions are designed differently. In order to detect the gazing position of the operator's eyes on the display screen 201 and the operation position of the operator's operating portion on the display screen 201, all of the camera sensors 202 located in the display region 202 will take photographs. Therefore, in the step S101 in the method for executing the operation action on the display screen according to an embodiment of the present disclosure, detecting the gazing position of the operator's eyes on the display screen and the operation position of the operator's operating portion on the display screen respectively may specifically include:

acquiring photographs including the operator's eyes and the operating portion by using the camera sensors;

detecting the gazing position of the operator's eyes on the display screen and the operation position of the operator's operating portion on the display screen respectively according to the acquired photographs including the operator's eyes and the operating portion.

Specifically, since the focal lengths of the camera sensors located in the respective pixel regions are different from each other, it causes that the photographs taken by some camera sensors are clear and the photographs taken by the other camera sensors are not clear due to the difference of focal lengths. Therefore, after the camera sensors acquire the photographs containing the operator's eyes and the operating portion, the acquired photographs are screened such that the clear photographs are selected, and then the gazing position of the operator's eyes on the display screen and the operation position of the operator's operating portion on the display screen are respectively detected according to the information in the clear photographs.

In a specific implementation, in order to detect whether the gazing position of the operator's eyes on the display screen is consistent with the operation position of the operator's operating portion on the display screen or not, to determine whether the next operation is executed, in the step S102 in the method for executing the operation action on the display screen according to an embodiment of the present disclosure, comparing the gazing position of the operator's eyes on the display screen with the operation position of the operator's operating portion on the display screen to determine whether the gazing position is consistent with the operation position or not may specifically include:

detecting whether a distance between the gazing position of the operator's eyes on the display screen and the operation position of the operator's operating portion on the display screen is within a preset range;

if yes, determining that the gazing position of the operator's eyes on the display screen is consistent with the operation position of the operator's operating portion on the display screen; and if no, determining that the gazing position of the operator's eyes on the display screen is not consistent with the operation position of the operator's operating portion on the display screen.

Specifically, the preset range may be preset according to actual requirements. Therefore, the preset range is adjustable, and the specific value thereof is not limited herein.

In a specific implementation, there are a plurality of second infrared transceivers in the display region of the display screen, in order to reduce calculation amount and reduce power consumption, after it is determined that the gazing position of the operator's eyes on the display screen is consistent with the operation position of the operator's operating portion on the display screen, it is necessary to select second infrared transceiver corresponding to the position according to the detected gazing position of the operator's eyes on the display screen and the detected operation position of the operator's operating portion on the display screen, and then the action of the operating portion is determined by the second infrared transceiver at this position. In this way, it improves the detection accuracy while reducing the calculation amount. Therefore, in the method for executing the operation action on the display screen according to an embodiment of the present disclosure, before the step S103 of executing the corresponding operation for the content displayed on the display screen according to the operation action of the operating portion, the method may further include:

determining one set of second infrared transceivers corresponding to a position of the operator according to the detected gazing position of the operator's eyes on the display screen and the detected operation position of the operator's operating portion on the display screen;

identifying the operation action of the operating portion by using the identified set of second infrared transceivers corresponding to the position of the operator.

For example, the display screen shown in FIG. 4A is used. Firstly, the gazing position of the operator's eyes with respect to the display screen 201 and the position of the operator's operating portion with respect to the display screen 201 are determined by the camera sensors 206, and then when it is determined that the gazing position of the operator's eyes with respect to the display screen 201 is consistent with the position of the operator's operating portion with respect to the display screen 201, and if it is the second infrared transceiver 208 (the second infrared transceiver in the dashed block) that corresponds to the position of the operator, then only the second infrared transceiver 208 is used to determine the information of the operating portion. In this way, it improves the detection accuracy, while reducing the calculation amount.

Based on the same inventive concept, an embodiment of the present disclosure further provides a device for executing an operation action. Since the operation principle of the device for executing the operation action is similar to the foregoing method for executing the operation action on the display screen, the operation manner of the device for executing the operation action may refer to the embodiments of the foregoing method for executing the operation action on the display screen, and therefore details will not be repeated herein.

Figure 5:
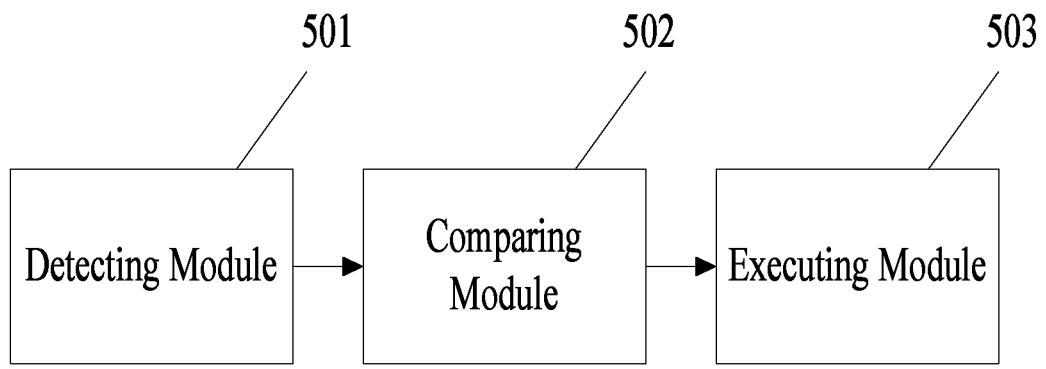
FIG. 5 is a block diagram showing a structure of a device for executing an operation action according to an embodiment of the present disclosure.

Specifically, in the above executing device for the operation action according to the embodiment of the present disclosure, as shown in FIG. 5, it may include: a detecting module 501, a comparing module 502, and an executing module 503.

The detecting module 501 is configured to respectively detect a gazing position of an operator's eyes on a display screen and an operation position of the operator's operating portion on the display screen.

The comparing module 502 is configured to compare the gazing position of the operator's eyes on the display screen with the operation position of the operator's operating portion on the display screen to determine whether the gazing position is consistent with the operation position or not.

The executing module 503 is configured to execute a corresponding operation for content displayed on the display screen according to the operation action of the operating portion in response to the gazing position of the operator's eyes on the display screen being consistent with the operation position of the operator's operating portion on the display screen.

In a specific implementation, in the above-mentioned device for executing the operation action according to the embodiment of the disclosure, as shown in FIG. 2A and FIG. 2B, the detecting module 501 may include one or more sets of position identifiers provided at a border of the display screen 201 (the region other than the display region 202); the position identifier 203 may include a gazing position identifier 2031 and an operating portion identifier 2032; one set of position identifiers are selected as a preliminary position identifying device. As an example, the position identifier 203 including the gazing position identifier 2031 and the operating portion identifier 2032 acts as the preliminary position identifying device.

The gazing position identifier 2031 in the preliminary position identifying device 203 is configured to detect the gazing position of the operator's eyes on the display screen.

The operating portion identifier 2032 in the preliminary position identifying device 203 is configured to detect the operation position of the operator's operating portion on the display screen.

According to an embodiment of the present disclosure, as shown in FIGS. 3A and 3B, in the device for executing the operation action, the gazing position identifier 2031 may include a first camera a for acquiring a photograph including the operator's eyes and the operating portion and a first infrared transceiver b for acquiring an operation action of the operating portion of the operator.

According to an embodiment of the present disclosure, as shown in FIGS. 3A and 3B, in the device for executing the operation action, the operating portion identifier 2032 may include a second camera c for acquiring a photograph including the operator's eyes and the operating portion and a third camera a' for acquiring a photograph including the operator's eyes and the operating portion.

In a specific implementation, in the above-mentioned executing device for the operation action according to the embodiment of the disclosure, as shown in FIGS. 4A to 4C, the detecting module 501 may include a plurality of camera sensors 206 (in regions filled with horizontal lines) and a plurality of second infrared transceivers 207 (in regions filled with vertical lines) provided in the display region 202 of the display screen 201.

The camera sensors 206 are configured to acquire photographs including the operator's eyes and the operating portion; the detecting module is configured to determine the gazing position of the operator's eyes on the display screen and the operation position of the operator's operating portion on the display screen respectively according to the acquired photographs including the operator's eyes and the operating portion;

The second infrared transceivers 207 are configured to determine the information of the operating portion.

In a specific implementation, the comparing module 502 and the executing module 503 may be implemented by a group of central processing units (CPUs) or other hardware structures that can implement processing and control functions, which are not limited herein.

The embodiments of the present disclosure provide a method for executing an operation action on a display screen and a device for executing an operation action. Firstly, a gazing position of an operator's eyes on the display screen and a operation position of the operator's operating portion on the display screen are detected, then a corresponding operation is executed for content displayed on the display screen according to the operation action of the operating portion, in response to the gazing position of the operator's eyes on the display screen being consistent with the operation position of the operator's operating portion on the display screen. Therefore, the method not only needs to determine the operation position of the operator's operating portion on the display screen, but also needs to determine the gazing position of the operator's eyes on the display screen, and the corresponding operation is executed to the content displayed on the display screen according to the operation action of the operating portion only when the two positions are consistent with each other. Thus, the method can greatly improve the detection accuracy for the operator's operating portion, thereby improving the operation accuracy for the content displayed on the display screen, effectively avoiding the errors in the operation and improving the operator's experience. In an embodiment of the present disclosure, the operating portion may be, for example, a hand, leg, head, or the like of the operator.

An embodiment of the present disclosure further provides a display screen including the above-described device for executing the operation action.

It will be apparent to those skilled in the art that various modifications and variations can be made to the present disclosure without departing from the spirit and scope of the present disclosure. Thus, if these modifications and variations to the present disclosure fall within the scope of the claims of the present disclosure and their equivalents, the present disclosure also intends to include these modifications and variations.

What is claimed is:

1. A method for executing an operation action on a display screen, the method comprising:
   detecting a gazing position of an operator's eyes on the display screen and an operation position of the operator's operating portion on the display screen respectively;
   comparing the gazing position of the operator's eyes on the display screen with the operation position of the operator's operating portion on the display screen to determine whether the gazing position is consistent with the operation position or not;
   in response to the gazing position of the operator's eyes on the display screen being consistent with the operation position of the operator's operating portion on the display screen, executing a corresponding operation for content displayed on the display screen according to the operation action of the operating portion,
   wherein a set of position identifiers fixed to a single rotatable base are provided at a border of the display screen, and the set of position identifiers comprises a gazing position identifier configured to detect the gazing position of the operator's eyes on the display screen and an operating portion identifier configured to detect the operation position of the operator's operating portion on the display screen, and
   detecting the gazing position of the operator's eyes on the display screen and the operation position of the operator's operating portion on the display screen respectively comprises:
      adopting the set of position identifiers as a preliminary position identifying device;
      detecting the gazing position of the operator's eyes on the display screen and the operation position of the operator's operating portion on the display screen respectively by using the gazing position identifier and the operating portion identifier of the preliminary position identifying device;
      rotating, according to the detected gazing position and operation position, the rotatable base to rotate the gazing position identifier and the operating portion identifier of the preliminary position identifying device simultaneously in such a way that they face towards the operator; and
      detecting the gazing position of the operator's eyes on the display screen and the operation position of the operator's operating portion on the display screen respectively by using the gazing position identifier and the operating portion identifier of the rotated preliminary position identifying device;
      or
   wherein a plurality of sets of position identifiers are provided at a border of the display screen, and each set of position identifiers of the plurality of sets of position identifiers is fixed to a single rotatable base and comprises a gazing position identifier configured to detect the gazing position of the operator's eyes on the display screen and an operating portion identifier configured to detect the operation position of the operator's operating portion on the display screen, and
      detecting the gazing position of the operator's eyes on the display screen and the operation position of the operator's operating portion on the display screen respectively comprises:
         adopting any one set of position identifiers or any one position identifier in the plurality of sets of position identifiers as a first preliminary position identifying device;
         detecting the gazing position of the operator's eyes on the display screen and the operation position of the operator's operating portion on the display screen respectively by using the first preliminary position identifying device;
         determining one set of position identifiers in the plurality of sets of position identifiers as a second preliminary position identifying device according to identifiable ranges of the plurality of sets of position identifiers and the detected gazing position and operation position;
         rotating, according to the detected gazing position and operation position, one, corresponding to the one set of position identifiers, of the rotatable bases to rotate the gazing position identifier and the operating portion identifier of the second preliminary position identifying device simultaneously in such a way that they face towards the operator; and
         detecting the gazing position of the operator's eyes on the display screen and the operation position of the operator's operating portion on the display screen respectively by using the gazing position identifier and the operating portion identifier of the rotated second preliminary position identifying device.

2. The method according to claim 1, wherein comparing the gazing position of the operator's eyes on the display screen with the operation position of the operator's operating portion on the display screen to determine whether the gazing position is consistent with the operation position or not comprises:
   detecting whether a distance between the gazing position of the operator's eyes on the display screen and the operation position of the operator's operating portion on the display screen is within a preset range or not;
   in response to the distance within the preset range, determining that the gazing position of the operator's eyes on the display screen is consistent with the operation position of the operator's operating portion on the display screen; and
   in response to the distance outside the preset range, determining that the gazing position of the operator's eyes on the display screen is not consistent with the operation position of the operator's operating portion on the display screen.

3. The method according to claim 1, wherein the set of position identifiers are provided at the border of the display screen, and
   detecting the gazing position of the operator's eyes on the display screen and the operation position of the operator's operating portion on the display screen respectively by using the gazing position identifier and the operating portion identifier of the preliminary position identifying device comprises:
      detecting the gazing position of the operator's eyes on the display screen by using the gazing position identifier while detecting the operation position of the operator's operating portion on the display screen by using the operating portion identifier; or
      detecting the gazing position of the operator's eyes on the display screen by using the gazing position identifier, and then detecting the operation position of the operator's operating portion on the display screen by using the operating portion identifier; or detecting the operation position of the operator's operating portion on the display screen by using the operating portion identifier, and then detecting the gazing position of the operator's eyes on the display screen by using the gazing position identifier.

4. The method according to claim 3, wherein the gazing position identifier comprises a first camera configured to acquire a photograph comprising the operator's eyes and a first infrared transceiver, and detecting the gazing position of the operator's eyes on the display screen by using the gazing position identifier comprises:

acquiring the photograph comprising the operator's eyes by the first camera to detect the gazing position of the operator's eyes on the display screen.

5. The method according to claim 4, wherein the operating portion identifier comprises a second camera configured to acquire a photograph comprising the operator's operating portion and a third camera, and detecting the operation position of the operator's operating portion on the display screen by using the operating portion identifier comprises:

acquiring photographs comprising the operating portion respectively by using the third camera and the second camera, so as to determine the operation position of the operator's operating portion on the display screen according to positions of the operating portion in the photographs.

6. The method according to claim 1, wherein a plurality of camera sensors are provided in a display region of the display screen, and detecting the gazing position of the operator's eyes on the display screen and the operation position of the operator's operating portion on the display screen respectively comprises:

acquiring photographs comprising the operator's eyes and the operating portion by using the camera sensors;

determining the gazing position of the operator's eyes on the display screen and the operation position of the operator's operating portion on the display screen respectively according to the acquired photographs comprising the operator's eyes and the operating portion.

7. The method according to claim 6, wherein a plurality of second infrared transceivers are provided in the display region of the display screen, and before executing the corresponding operation for the content displayed on the display screen according to the operation action of the operating portion, the method further comprises:

determining a set of second infrared transceivers corresponding to a position of the operator according to the detected gazing position of the operator's eyes on the display screen and the operation position of the operator's operating portion on the display screen;

identifying the operation action of the operating portion by using the determined set of second infrared transceivers.

8. The method according to claim 5, wherein the third camera and the first camera are one same camera.

9. The method according to claim 1, wherein the plurality of sets of position identifiers are provided at the border of the display screen and before executing the corresponding operation for the content displayed on the display screen according to the operation action of the operating portion, further comprising:

determining one set of position identifiers corresponding to a position of the operator according to the detected gazing position of the operator's eyes on the display screen and the position of the operator's operating portion with respect to the display screen;

identifying the operation action of the operating portion by using the determined one set of position identifiers.

* * * * *